United States Patent
Ahonpää

(10) Patent No.: US 7,346,323 B2
(45) Date of Patent: Mar. 18, 2008

(54) DIVERSITY RECEPTION FOR CO-SITING BASE STATIONS

(75) Inventor: Timo Ahonpää, Oulu (FI)

(73) Assignee: Nokia Corporation, Espoo (FI)

( * ) Notice: Subject to any disclaimer, the term of this patent is extended or adjusted under 35 U.S.C. 154(b) by 488 days.

(21) Appl. No.: 11/113,328

(22) Filed: Apr. 25, 2005

(65) Prior Publication Data

US 2006/0229049 A1 Oct. 12, 2006

(30) Foreign Application Priority Data

Apr. 8, 2005 (FI) .................................. 20055161

(51) Int. Cl.
*H04B 1/06* (2006.01)
(52) U.S. Cl. ...................... 455/272; 455/500; 455/526; 455/561; 455/562.1
(58) Field of Classification Search ................ 455/272, 455/500, 526, 561, 562.1
See application file for complete search history.

(56) References Cited

U.S. PATENT DOCUMENTS

| | | | |
|---|---|---|---|
| 6,748,197 B2* | 6/2004 | Lindemann et al. | 455/82 |
| 6,778,147 B2* | 8/2004 | Sanada et al. | 343/853 |
| 6,823,177 B1 | 11/2004 | Lucidarme | |
| 6,928,298 B2* | 8/2005 | Furutani et al. | 455/553.1 |
| 2004/0137947 A1* | 7/2004 | Nimmo-Smith | 455/561 |
| 2004/0203552 A1* | 10/2004 | Horiuchi et al. | 455/333 |
| 2006/0197538 A1* | 9/2006 | Leinonen et al. | 324/533 |

FOREIGN PATENT DOCUMENTS

| | | |
|---|---|---|
| EP | 1294045 | 3/2003 |
| FR | 2789807 | 8/2000 |
| FR | 2832861 | 5/2003 |
| WO | WO 03/107540 | 12/2003 |

* cited by examiner

*Primary Examiner*—Sanh D. Phu
(74) *Attorney, Agent, or Firm*—Squire, Sanders & Dempsey, LLP

(57) ABSTRACT

A connection unit comprising a feeder port for connecting the connection unit to an antenna feeder, a first relay port for connecting the connection unit to a receiving and transmitting port of a first base station, and a second relay port for connecting the connection unit to a diversity receiver port of a second base, wherein the connection unit comprises a directional coupler for separating signals where a signal in the feeder port is divided into a first output signal in the first relay port of the first base station and a second output signal in the diversity receiver port of a second base station. A signal in the first relay port is, however, passed undivided to the feeder port. Diversity may be selectively provided in the receiving direction, but substantially no additional loss is introduced to the main transmission direction.

25 Claims, 5 Drawing Sheets

DIVERSITY RECEPTION FOR CO-SITING BASE STATIONS

FIELD OF THE INVENTION

The invention relates to a connection unit and an antenna system according to the preambles of the independent claims.

BACKGROUND OF THE INVENTION

A site is a location where network elements or other telecommunication equipment have been installed. A site typically comprises, for example, a base station and transmission equipment, with an equipment shelter and antenna tower. Due to the costs related to site acquisition and site maintenance, traditionally an effort has been made to locate network equipment that function on different frequency bands on one site. Recently the possibility to co-site also base stations of different cellular technologies operating on the same frequency band has become more and more interesting.

A typical goal with co-siting base stations has been to minimize the number of antennas and antenna feeders on the site. An antenna feeder corresponds here to a transmission line between antenna and radio relay equipment, transmitting the RF signal in either direction. Antenna feeders are typically very expensive, so it is natural that their number is optimized as far as possible. When cables are used, also the load on the mast structure needs to be considered. Additionally, in many locations the number of antennas per site is limited by regulations, due to the visual impact on the landscape.

On the other hand, a basic problem in digital radio communication is that a large number of errors occur due to channel attenuation, for example when the channel is in a fade. To overcome this, the base station receiver is typically provided with two or more replicas of the same information signal transmitted through independently fading channels. This means that the probability that all the signal components will fade simultaneously can be reduced considerably. The method of reception in which a single output signal is derived from a combination of or selection from a plurality of transmission channels or paths is called as diversity reception.

Sharing of antennas such that diversity reception is provided poses some technical requirements that need to be carefully considered. In the network planning phase the network configuration is assessed and dimensioned and a detailed network solution is defined. The basic parameters in dimensioning relate to system sensitivity of the base station and the output power available in the antenna. It is essential that these factors should not change considerably because of the sharing arrangement. It is also important that cost-effectiveness of the technical solution is considered from all aspects: the required equipment need to be inexpensive, easily installed and basically maintenance free. It is also desirable that only minimal changes to any existing site equipment be incurred, and the valuable radio band be used to the fullest possible extent.

One of the conventional ways to enable several radio receivers to utilize a single antenna system is to use multi-couplers. There are many variations in the design concepts, but basically a multicoupler splits an input signal and distributes the partitioned RF signal. Wideband combining systems can be used for any frequency separation, which typically makes them very useful in site solutions. However, the theoretical loss introduced to the transmitted signal in wideband combining of signals from two base stations is about 3 dB, and in actual implementations reaches even 3,5 dB, at the minimum. In sharing, the sensitivity of the base station would also decrease correspondingly. Such degradation of the basic design criterion of the network planning is not acceptable, especially in the most typical sharing case, i.e. when a new base station is installed to share the feeder of another, already operating base station.

Filter combining is a method that may be used when a guard band exists between the channels, i.e. when a narrow frequency band is arranged between adjacent channels of the co-sited base stations. Such a guard band, however, leads to inefficient usage of the spectrum, which in some cases may even preclude the possibility of co-siting. Furthermore, in filter combining, a band pass filter passing only the operating frequencies of the respective base station is arranged between the feeder and the antenna connector of the base station. Even though the downlink power loss in filter combining is considerably smaller than in wideband combining, and the uplink power loss is to a great extent compensable with masthead amplifiers, the solution is too complicated and expensive for most of the installations. Firstly, the filters need to be tuneable to different channel allocations of different sites. This means that some kind of control system for controlling the parameters of the band pass filter would be needed, for example mechanical control with step motor. This increases the price of the filter components and thus the total cost of the sharing arrangement considerably. Additionally, the tuning needs to be done site by site, which complicates the commissioning and maintenance of the site.

In some prior art solutions, diversity is implemented by splitting the received signal with an internal divider located within the first base station and by forwarding the diversity reception signal to the other base station through an additional diversity cross feeding connector. In most modern integrated base stations such cross feeding dividers and connectors are typically not available, and introducing such arrangements to existing or new base stations is not economically viable. Additionally, the arrangement is not operable when the base stations are sub-banded, i.e. when the operable carrier block of the second base station does not coincide with the receiver carrier block of the first base station.

SUMMARY OF THE INVENTION

An object of the present invention is to provide an improved solution for two co-siting base stations to share one antenna feeder for main and diversity reception such that the technical and economical requirements discussed above are optimally met. The objects of the invention are achieved by a connection unit and an antenna system, which are characterized by what is stated in the independent claims. The preferred embodiments of the invention are disclosed in the dependent claims.

The invention is based on the idea of arranging between the feeder and the two base stations sharing the feeder a connection unit that splits the signal flowing in the receiving direction to a main signal and a diversity signal and fully passes the signal flowing in the transmission direction. An advantage of the invention is that substantially no additional loss is introduced to the main transmission direction, and at the same time the diversity may be selectively provided in the receiving direction. The effect is achieved with a streamlined configuration that is economical and causes minimal changes to the existing site elements. These and further advantages of the invention are discussed in more detail in the detailed description of the invention.

BRIEF DESCRIPTION OF THE DRAWINGS

In the following the invention will be described in greater detail by means of preferred embodiments with reference to the attached drawings, in which.

DETAILED DESCRIPTION OF THE PREFERRED EMBODIMENTS

Figure 1:
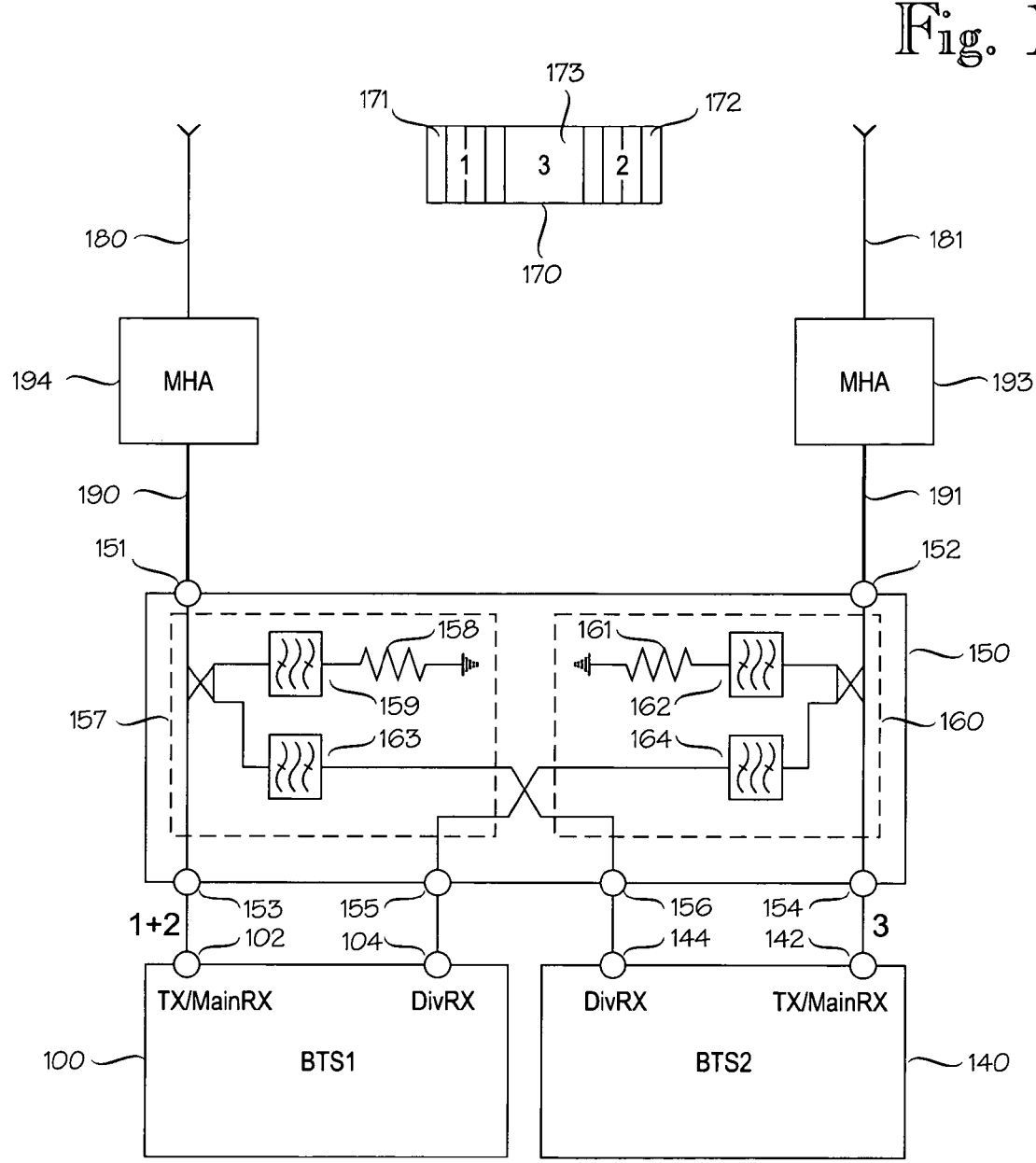
FIG. 1 shows a block diagram illustrating an embodiment of the invention in a configuration with two co-siting base stations.

The invention is applicable to any site configuration that comprises at least two base stations of different cellular technologies and where the carriers of each base station may be arranged within the operating frequency block of one antenna. FIG. 1 shows a block diagram illustrating an embodiment of the invention in a configuration with two co-siting base stations BTS1 100 and BTS2 140. In the embodied example the operator has an operating network of 900 MHz Global System for Mobile Telecommunications (GSM). The operator has been allocated a frequency block pair such that reception is in a frequency block on 880-915 MHz band and transmission is in a frequency block on 925-960 MHz band. The operator has arranged the allocated channels such that within a frequency block 170, GSM base stations occupy the lower and higher frequencies in blocks "1" 171 and "2" 172, and Wideband Code Multiple Access (WCDMA) base stations occupy frequencies "3" 173 within the GSM bands. In FIG. 1, BTS1 illustrates a GSM base station and BTS2 illustrates a Wideband Code Multiple Access (WCDMA) base station. For a person skilled in the art it is clear that the scope of protection is not limited to these technologies and exemplary frequencies.

The minimum distance required between the GSM carriers and the WCDMA carriers depends on the allowed interference from GSM user equipment to WCDMA base stations. It has been noted that from the system point of view, the optimal frequency allocation within a block of contiguous carriers may be achieved when the WCDMA carriers 173 are located in the middle of the operable block, and the WCDMA carriers 170 are surrounded by the controlled GSM carriers 171, 172, i.e. typically the operator's own GSM carriers. Of the logical channels of GSM, the highest transmission power and thus the highest risk for interference are related to the Broadcast Control Channels (BCCH). Assuming that the first adjacent GSM carriers in the GSM frequency blocks 171, 172 are arranged not to be Broadcast Control Channels (BCCH), a frequency allocation without guard bands between the GSM and WCDMA carriers may be arranged. For example, with a 4 MHz WCDMA frequency block, a 2,1 MHz minimum distance to a non-BCCH and a 2,3 MHz minimum distance to the remaining BCCH or non-BCCH channels are achieved, and no channel capacity needs to be reserved to empty bands between the carrier blocks of different GSM and WCDMA technologies.

The first base station BTS1 100 illustrates an arrangement associated with one sector of a cell of a GSM base station. The main radio frequency interfaces of a base station are the antenna connections that typically comprise a duplexed transmitting and main receiving port TX/MainRX 102 and a diversity receiving port DivRX 104. Correspondingly, the second base station BTS2 140 illustrates an arrangement associated with one sector of a cell of a WCDMA base station. The antenna connections of BTS2 also comprise a duplexed transmitting and main receiving port TX/MainRX 142 and a diversity receiving port DivRX 144. The operators typically buy systems from various vendors, and therefore any sharing arrangement of the base stations should preferably be such that no additional antenna connections and/or changes in the hardware or software of the sharing base stations are required.

The first base station BTS1 100 and the second base station BTS2 140 are electrically connected to antennas 180, 181. In the embodied example, feeders correspond to cables 190, 191 arranged between antennas 180, 181 and the base stations 100, 140 to transmit radio frequency signals in the opposite receiving and transmitting directions. For a person skilled in the art it is, however, clear that a feeder may comprise any configuration capable of transmitting the radio frequency signal between an antenna and radio relay equipment. For example, different types of coaxial cables or wave guides may be utilized.

The first feeder 190 is connected to the first antenna 180 and the second feeder 191 is connected to the second antenna 181. Arranged between the feeders 180, 181 and the antenna connections 102, 104, 142, 144 of the base stations 100, 140, there is arranged a connection unit 150. The connection unit 150 comprises a first feeder port 151 for connecting the unit 150 to the first feeder 190 of the first antenna 180, and a second feeder port 152 for connecting the unit 150 to the second feeder 191 of the second antenna 181.

The connection unit 150 also comprises a first relay port 153 for connecting the connection unit 150 to the transmitting and main receiving port TX/MainRX 102 of the first base station BTS1 100, and a second relay port 156 for connecting the connection unit 150 to the diversity receiving port DivRX 144 of the second base station BTS2 140. Additionally, the connection unit 150 comprises a third relay port 155 for connecting the connection unit 150 to the diversity receiving port DivRX 104 of the first base station BTS1 100, and a fourth relay port 154 for connecting the connection unit to the transmitting and main receiving port TX/MainRX 142 of the second base station BTS2 140.

Figure 2:
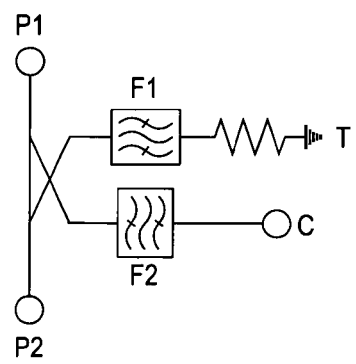
FIG. 2 illustrates the coupling arrangement of FIG. 1.

According to the invention, the connection unit 150 further comprises a first frequency selective directional coupler 157. A more detailed description of the coupling arrangement of FIG. 1 is shown in FIG. 2. In a directional coupler, part of the input power entering a first port P1 is passed on to a coupled port C, and part to a second port P2. The coupling factor of the directional coupler can be calculated from:

Coupling factor [dB]=−10*log($P_{coupled}/P_{input}$)

For example, when the coupling factor is 3 dB, the input power is divided equally between the output port and the coupled port. Additionally, a directional coupler is a linear and reciprocal device, which means that when a signal enters the second port P2, the input power is divided between the termination T and the first port P1. In the context of an antenna system, the received power from an antenna feeder is divided between the second port P2 and the coupled port C, and the transmission power from the base station is divided between the termination T and port P1. With a coupling factor of 3 dB, this means that up to half of the input power to the second port P2 is directed to the termination T and dissipates without entering the first port P1. Additionally, the directivity is always finite, so some part of the input power that enters the first port P1 may also enter the termination T and dissipate.

In the context of an antenna system the transmitting signals TX directed to the second port P2 and the receiving signals RX directed to the first port P1 are on different frequency bands. A first filter F1 located between the divider and the termination and arranged not to pass the transmitting signals TX prevents the transmitted power from entering the termination. The filter F1 may be implemented, for example, by means of an RX band pass filter, or TX band stop filters, or any other configuration that may be arranged to block the transmitting signals from entering the termination. A second filter F2 located between the divider and the coupled port C may be additionally arranged to prevent the leaking of the transmitting signals TX to the coupled port C, as discussed earlier.

In the embodied example the first directional coupler 157 is arranged such that a transmitting signal from the first base station BTS1 100 enters the connection unit 150 through the first relay port 153 that here corresponds to the second port P2 of FIG. 2. Consequently, a transmitting signal enters the first relay port 153 and is divided between the termination 158 and the first feeder port 151. However, the termination path further comprises a first filter 159 that is arranged to block the transmitting signal so that it does not proceed to the load of the termination, and thus the transmitting signal passes without substantial losses through the first feeder port 151 to the feeder cable 190.

Correspondingly, the branch of the second antenna 181 comprises a second frequency selective directional coupler 160. Similar to the first frequency selective directional coupler, the second frequency selective directional coupler 160 is arranged with an internal termination 161 and a second band pass filter 162 such that a transmitting signal entering the connection unit 150 from the second base station BTS2 140 passes without substantial losses through the first feeder port 152 to the feeder cable 191.

On the other hand, the first directional coupler 157 splits a signal arriving from the first antenna feeder 190 and entering the connection unit through the first feeder port 151 to a main path and a coupled path. The main path is led through the first relay port 153 to the main receiving port TX/MainRX 102 of the first base station BTS1 100, and the coupled path is led through the second relay port 156 to the diversity receiving port DivRX 144 of the second base station BTS2 140. As discussed above, in order to prevent leaking of the transmitting signal to the coupled relay ports 155, 156, the coupled path of the first directional coupler further comprises a third filter 163 tuned to the receiving band, and the coupled path of the second directional coupler further comprises a fourth filter 164, correspondingly tuned to the receiving band. For a person skilled in the art it is clear that instead of the band pass filter, any other configuration arranged to block the transmitting signals from entering the termination may be used.

Since the received signal is divided into two parts, the division is considered a loss in both the main path and the coupled path. Additionally, filtering introduces some additional losses. In order to maintain appropriate base station system sensitivity levels, the receiving signal is preferably amplified at some point of the receiving leg. In the embodied example, masthead amplifiers 193, 194 are arranged at the ends of the feeders close to the antenna connectors. A masthead amplifier is a low noise amplifier used to compensate the losses between the antenna connector and base transceiver station input connector.

On the basis of the invented solution, co-siting base stations may share the antennas and the antenna feeders and provide receiver diversity by using only the existing antenna connector configuration. This makes it possible to add a new base station beside of an existing base station without essential additional hardware and/or software changes in either of the base stations. Since no tailored features are required, diversity co-siting of base stations of different vendors becomes easier. Due to cross-feeding in the connection unit, the antennas and feeders can be effectively used for main and diversity reception, and there is actually no need to add new antennas and antenna feeders for diversity purposes only. A guard band is not necessarily required, so that the available frequency block of the site is optimally utilized.

The configuration is simple, which keeps the cost of the system reasonable. Furthermore, no on-site tuning is mandatorily required, due to which also commissioning and maintenance costs may be kept at a low level. Since no filtering is necessary before the division, the configuration is applicable to sub-banded base stations as well. All in all, an optimised combination fulfilling a number of economic and technical requirements posed by sharing antennas for diversity reception is achieved.

Figure 3:
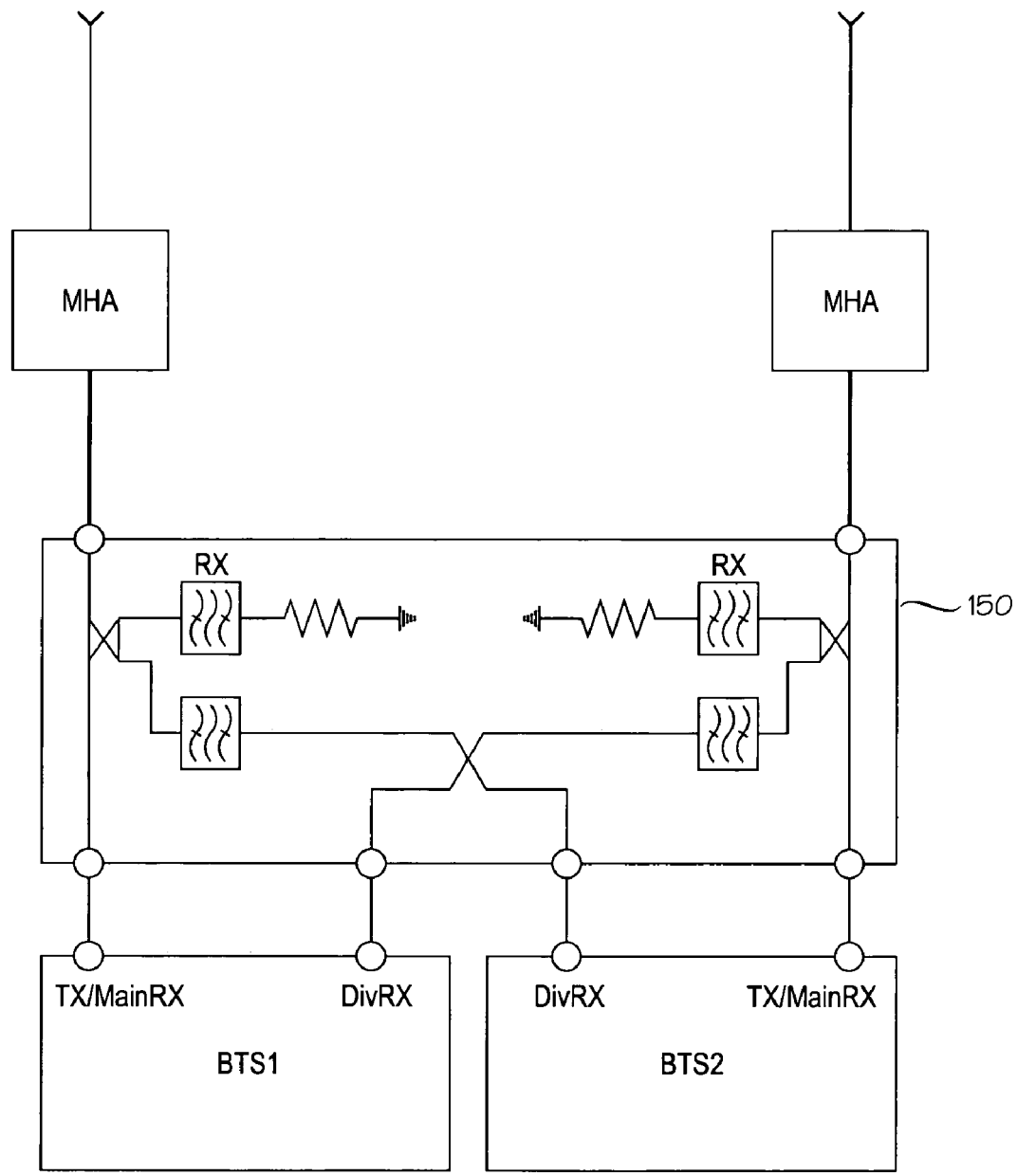
FIG. 3 illustrates an alternative embodiment of the invention in the same configuration.

Part of the selective tuning associated with the directional coupling may be performed within the connection unit or at any stage in the diversity reception path. FIG. 3 illustrates an alternative embodiment of the invention, where the tuning to the receiving band of the base station is implemented by means of an internal diversity RX filter existing already within the base station, instead of the third filter 163 and the fourth filter 164 of the connection unit 150. The solution is basically as in FIG. 1, but the connection unit 150 does not comprise first and second filters 161, 162. The advantage of such an embodiment is that is makes the connection unit 150 even simpler. It is clear, however, that the electrical length of the cabling between the directional couplers 157,159 need to be controlled to ensure proper phase matching between the directional coupler and the internal RX filter.

Figure 4:
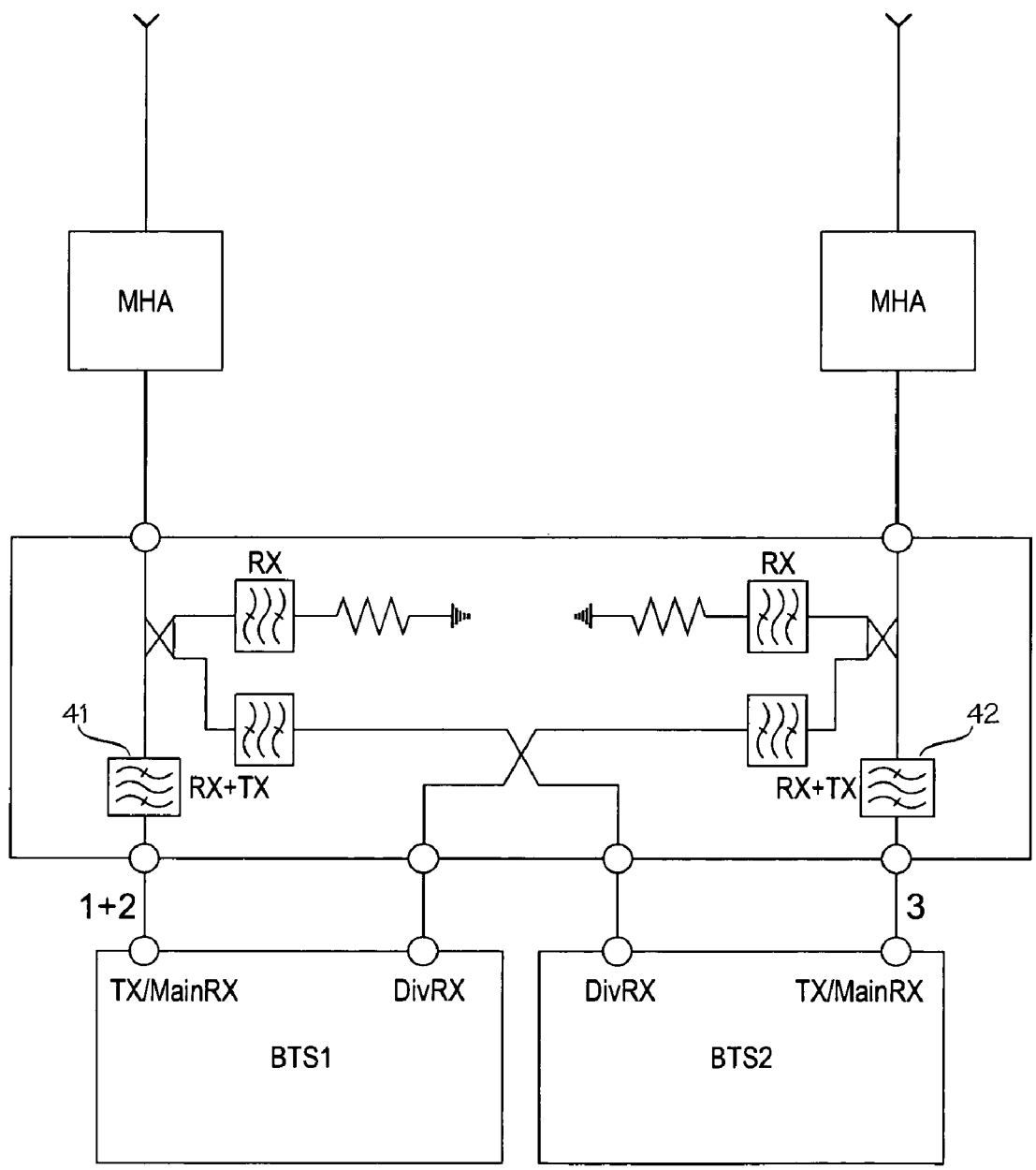
FIG. 4 illustrates an embodiment with equalized delays in the receiving path.

FIG. 4 illustrates a further embodiment of the invention. The elements of FIG. 4 correspond to elements of FIG. 1, but comprise wideband band pass filters 41, 42 that are arranged to pass both transmitting and receiving bands in each of the main transmission and receiving paths. The filters are arranged to equalize delays inflicted on the diversity reception, when selective tuning to the receiving band of the base station is implemented. The wideband band pass filters 41, 42 introduce a delay that corresponds to the delay due to filtering in the coupled path. The advantage of the embodiment is that it eliminates problems in the reception path without, however, introducing substantial losses to the transmitting path.

Figure 5:
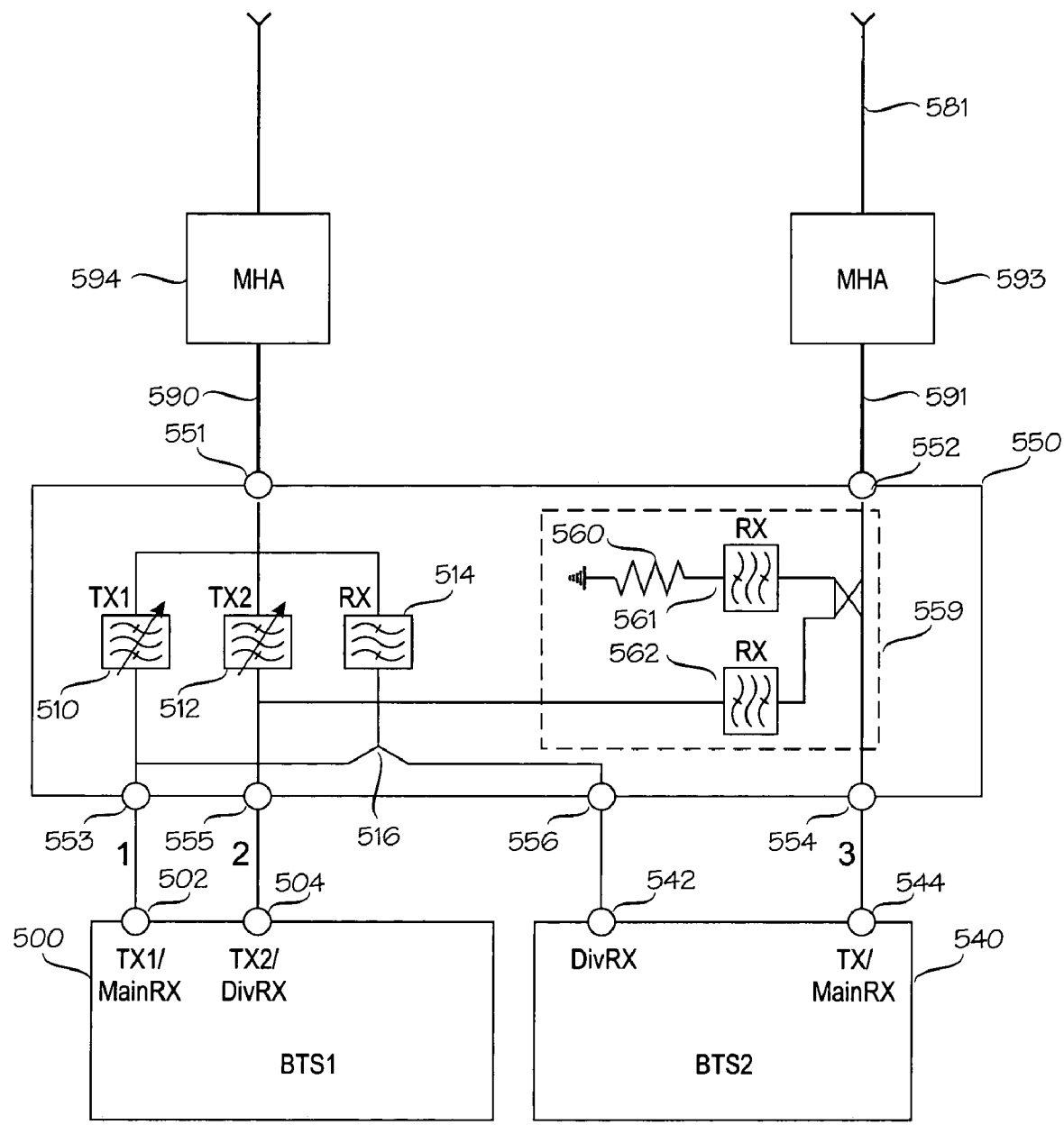
FIG. 5 illustrates an embodiment that allows dual duplexing.

FIG. 5 illustrates a further embodiment of the invention, where dual duplexing is facilitated. Conventionally base stations are arranged such that a transmitting path and one receiving path are coupled by means of an internal duplex filter so that one antenna can be used for reception and transmission of the respective paths. Another receiving path (the diversity receiving path) is coupled to another antenna through an internal receiver filter. If the base station has a lot of channels, which is often the case in GSM systems, the transmission paths need to be summed before duplex filtering, for example by means of wide band combining. Naturally, the more channels exist, the more losses are incurred in the combining. Therefore, in some cases it is more advantageous to divide the transmission paths into two parts, which are directed through separate duplexers to separate antennas. In the following, such an arrangement is called dual duplexing.

In the current embodiment, the two radio frequency interfaces of the first base station comprise a duplexed transmitting and main receiving port TX1/MainRX 502 and a duplexed transmitting and diversity receiving port TX2/DivRX 504. As in FIG. 1, the antenna connections of BTS2 540 comprise a duplexed transmitting and main receiving port TX/MainRX 544 and a diversity receiving port DivRX 542. The connection unit 550 comprises a first relay port 553 for connecting the connection unit 550 to the first duplexed transmitting and main receiving port TX1/MainRX 502 of the first base station BTS1 500, a second relay port 556 for connecting the connection unit 550 to the diversity receiving port DivRX 544 of the second base station BTS2 540, a third relay port 555 for connecting the connection unit 150 to the second duplexed transmitting and diversity receiving port TX2/DivRX 504 of the first base station BTS1 500, and a fourth relay port 554 for connecting the connection unit 550 to the transmitting and diversity receiving port TX2/DivRX 542 of the second base station BTS2 540.

The transmission path of the second feeder port 552 comprises a frequency selective directional coupler 559 with internal termination 560, a receiver band bass filter 561 and an internal receiver band bass filter 562, similar to the configuration of FIG. 1. However, the transmission path of the first station 500 comprises tunable filters 510, 512 that pass the subbanded transmitting blocks TX1 and TX2 of the first base station, respectively. Since a guard band exists between the transmitting blocks TX1 and TX2, the outputs of tunable filters 510, 512 are summed, thereby forming a filter combiner. The receiving path comprises a band pass filter 514 and a decoupler 516 for dividing the received signal through the first relay port 553 to the transmitting and main receiving port TX1/MainRX 502 of the first base station 500 and through the second relay port 556 to the diversity receiving port DivRX 544 of the second base station 540. The advantage of the embodiment is that, in addition to the advantages discussed above, it allows use of dual duplexed transmission and receiving in the first base station.

Figure 6:
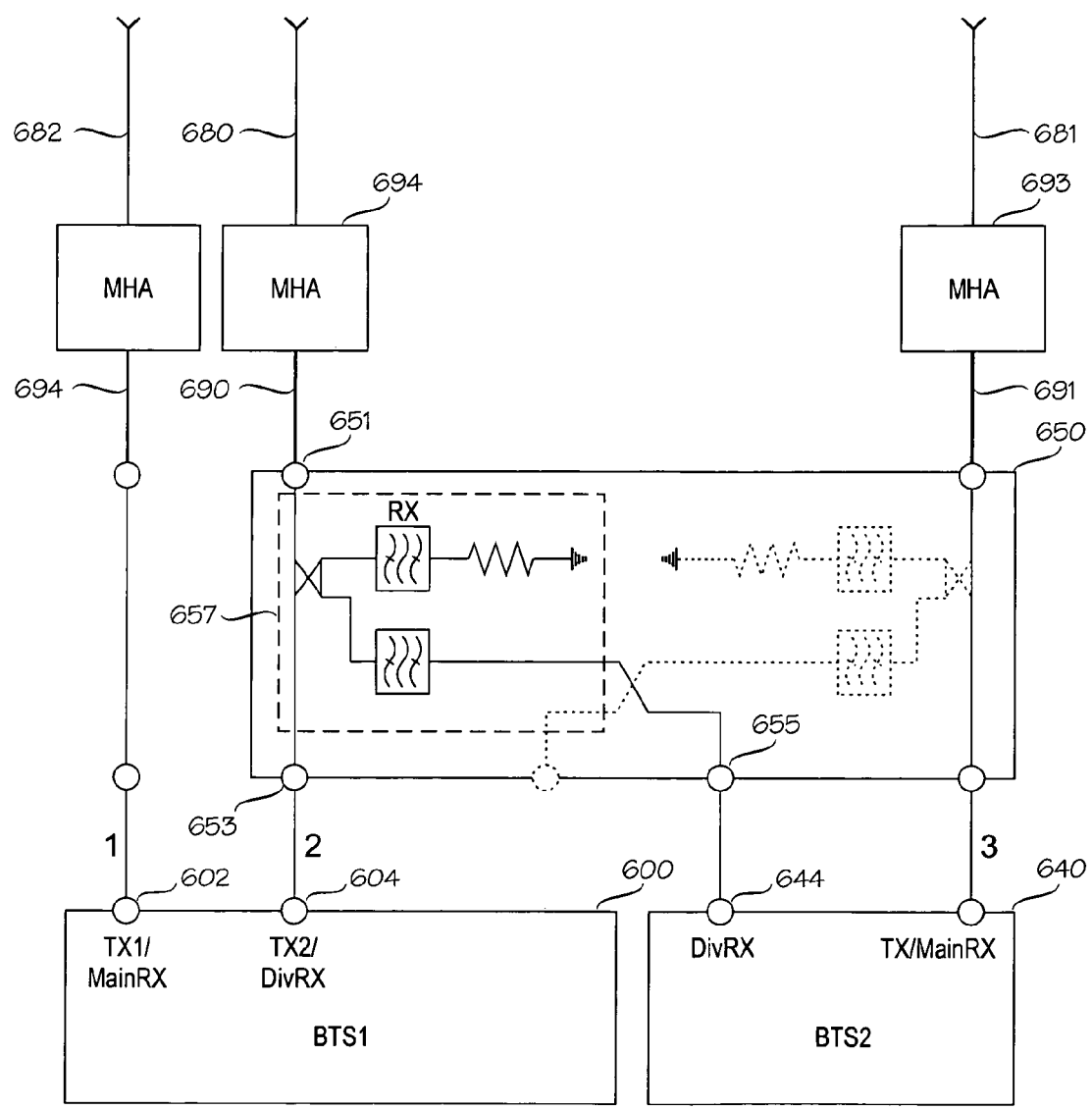
FIG. 6 illustrates an embodiment that allows dual duplexing with reduced losses.

It is, however, clear that the configuration of FIG. 5 is more complicated and introduces more losses than the configuration of FIG. 1. The additional losses introduced may be eliminated by adding a further antenna to the configuration. FIG. 6 illustrates an embodiment of the present invention where dual duplexing is facilitated but losses are remarkably reduced in comparison with the configuration of FIG. 5. The first and the second base stations 600, 640 correspond to the base stations of FIG. 4. The first antenna 680 and the second antenna 681 are connected to the base stations through the masthead amplifier 693, 694, to the feeders 690, 691 and the connection unit 650, corresponding to the configuration of FIG. 5. However, the configuration comprises an additional antenna 682 that is connected through a masthead amplifier 695 and a separate feeder 694 to the first duplexed transmitting and main receiving port TX1/MainRX 602 of the first base station 600. The first relay port 653 of the connection unit 650 is connected to the second duplexed transmitting and diversity receiving port TX1/DivRX 604 of the first base station 600, and provides here the diversity reception of the first base station 600. The diversity signal comes from the main path of the first frequency selective directional coupler 657 within the connection unit 650. The transmitted signals in the first transmission block TX1 of the first base station 600 are delivered directly to the third antenna 682, and substantially no additional losses are introduced. The transmitted signals in the second transmission block TX2 of the first base station 600 are delivered through the first directional coupler 657 of the connection unit 650, and thus substantially no additional losses are introduced to the downlink direction. The coupling path of the first directional coupler 657 is fed to the diversity receiving port DivRX 644 of the second base station 640.

The advantage of the configuration of FIG. 6 is that is reduces the losses related to co-siting of dual duplexed base stations. It should be noted that the connection unit of FIG. 1 is applicable as such to this configuration. The third relay port 155 of FIG. 1 used for connecting the connection unit 150 to the diversity receiving port DivRX 144 of the second base station BTS1 140 in FIG. 1 may be left unconnected. Thus, even though an additional antenna is needed, the streamlined applicability of the connection unit allows use of site-specific configuration without heavy predictive simulation and time-consuming procedures during the installation and commissioning of the site.

It will be obvious to a person skilled in the art that, as the technology advances, the inventive concept can be implemented in various ways. The invention and its embodiments are not limited to the examples described above but may vary within the scope of the claims.

What is claimed:

1. A connection unit, comprising:
    a feeder port for connecting the connection unit with an antenna feeder;
    a first relay port for connecting the connection unit to a receiving and transmitting port of a first base station;
    a second relay port for connecting the connection unit to a diversity receiver port of a second base station; and
    a directional coupler for separating signals where a signal in the feeder port is divided into a first output signal in the first relay port and a second output signal in the second relay port, and a signal in the first relay port is passed undivided to the feeder port.

2. A connection unit according to claim 1, wherein the directional coupler comprises a first filter located opposite to the first relay port and arranged to block a signal on at least one transmitting frequency of the first base station.

3. A connection unit according to claim 2, wherein the first filter is arranged to block all transmitting frequencies of the first base station.

4. A connection unit according to claim 2, wherein the first filter is a band pass filter configured to pass at least one receiving frequency band of the second base station.

5. A connection unit according to claim 2, wherein the first filter is a band stop filter configured to stop the at least one transmitting frequency of the first base station.

6. A connection unit according to claim 1, further comprising:
    a second filter configured to block signals on at least one transmitting frequency of the first base station.

7. A connection unit according to claim 1, wherein the second filter is a band pass filter configured to pass a defined receiving band of the second base station.

8. A connection unit according to claim 1, wherein the second filter is a band stop filter configured to stop at least one transmitting frequency of the first base station.

9. A connection unit according to claim 1, further comprising:
   a filter passing both receiving and transmitting bands in a main transmission and receiving path between the directional coupler and the first relay port.

10. A connection unit according to claim 1, further comprising:
   a second feeder port for connecting the connection unit to a second antenna feeder;
   a third relay port for connecting the connection unit to a receiving and transmitting port of the second base station;
   a fourth relay port for connecting the connection unit to a diversity receiving port of the first base station;
   a first transmission filter arranged in a transmission path between the second feeder port and the third relay port, and configured to pass a first transmitting block of the second base station;
   a second transmission filter arranged in the transmission path between the second feeder port and the second relay port and configured to pass a second transmitting block of the second base station; and
   a decoupler coupled to the first feeder port and configured to divide an input signal from the first feeder port between the third relay port and the fourth relay port.

11. An antenna system for two co-siting base stations comprising
   a first antenna;
   a first antenna feeder connected to the antenna;
   a connection unit comprising a first feeder port for connecting the connection unit to the first antenna feeder of the first antenna;
   a first relay port for connecting the connection unit to a receiving and transmitting port of a first base station; and
   a second relay port for connecting the connection unit to a diversity receiver port of a second base station, wherein the connection unit comprises a directional coupler for separating signals where a signal in the feeder port is divided into a first output signal in the first relay port and a second output signal in the second relay port, and a signal in the first relay port is passed undivided to the feeder port.

12. An antenna system according to claim 11, wherein the directional coupler comprises a first filter located opposite to the first relay port and configured to block a signal on at least one transmitting frequency of the first base station.

13. An antenna system according to claim 12, wherein the first filter is arranged to block all transmitting frequencies of the first base station.

14. An antenna system according to claim 12, wherein the first filter is a band pass filter configured to pass at least one receiving frequency band of the second base station.

15. An antenna system according to claim 12, wherein the first filter is a band stop filter configured to stop the at least one transmitting frequency of the first base station.

16. An antenna system according to claim 11, wherein the connection unit further comprises a second filter configured to block signals in at least one transmitting frequency of the first base station.

17. An antenna system according to claim 16, wherein the second filter is a band pass filter configured to pass a defined receiving band of the second base station.

18. An antenna system according to claim 16, wherein the second filter is a band stop filter configured to stop at least one transmitting frequency of the first base station.

19. An antenna system according to claim 11, wherein the connection unit further comprises a filter passing both receiving and transmitting bands in a main transmission and receiving path between the directional coupler and the first relay port.

20. An antenna system according to claim 11, wherein the connection unit further comprises
   a second feeder port for connecting the connection unit to a second antenna feeder,
   a third relay port for connecting the connection unit to a receiving and transmitting port of the second base station,
   a fourth relay port for connecting the connection unit to a diversity receiving port of the first base station,
   a first transmission filter arranged in a transmission path between the second feeder port and the third relay port, and configured to pass a first transmitting block of the second base station,
   a second transmission filter arranged in the transmission path between the second feeder port and the second relay port and configured to pass a second transmitting block of the second base station, and
   a decoupler coupled to the first feeder port and configured to divide an input signal from the first feeder port between the third relay port and the fourth relay port.

21. An antenna system for two co-siting base stations, comprising:
   a connection unit comprising a first feeder port for connecting the connection unit with a first antenna feeder, a first relay port for connecting the connection unit to a transmitting and diversity receiver port of a first base station, a second relay port for connecting the connection unit to a diversity receiver port of a second base station, a directional coupler for separating signals where a signal in the first feeder port is divided into a first output signal in the first relay port and a second output signal in the second relay port, and a signal in the first relay port is passed undivided to the first feeder port; and
   a first antenna connected to the connection unit through a first feeder; and
   a second antenna connected to a receiving and transmitting port of the first base station.

22. A method for connecting a first base station and a second base station to an antenna feeder through a connection unit, comprising:
   connecting the connection unit to the antenna feeder through a feeder port;
   connecting the connection unit to a receiving and transmitting port of a first base station through a first relay port;
   connecting the connection unit to a diversity receiver port of a second base station through a second relay port; and
   separating signals with a directional coupler by dividing a signal from the feeder port into a first output signal in the first relay port and a second output signal in the second relay port, wherein a signal from the first relay port is passed undivided to the feeder port.

23. A method for co-siting a first base station and a second base station, comprising:
   connecting a first antenna to a connection unit through a first feeder;
   connecting the connection unit to a first antenna feeder through a first feeder port;

connecting the connection unit to a transmitting and diversity receiver port of a first base station through a first relay port;

connecting the connection unit to a diversity receiver port of a second base station though a second relay port;

separating signals in a directional coupler by dividing a signal in the first feeder port into a first output signal in the first relay port and a second output signal in the second relay port, wherein a signal in the first relay port is passed undivided to the first feeder port, and connecting a second antenna to a another receiving and transmitting port of the first base station.

24. A base station system, comprising:

a first base station;

a second base station;

a first antenna;

a second antenna;

a first feeder between the first antenna and the first base station;

a second feeder between the second antenna and the second base station; and a connection unit comprising a feeder port for connecting the connection unit with an antenna feeder, a first relay port for connecting the connection unit to a receiving and transmitting port of the first base station, a second relay port for connecting the connection unit to a diversity receiver port of the second base station, and a directional coupler for separating signals where a signal in the feeder port is divided into a first output signal in the first relay port and a second output signal in the second relay port, and a signal in the first relay port is passed undivided to the feeder port.

25. A base station system, comprising:

a first base station;

a second base station;

a connection unit;

a first antenna;

a second antenna with one or more masthead amplifiers;

a first feeder between the first antenna and the first base station;

a second feeder between the second antenna and the second base station; and a connection unit comprising a first feeder port for connecting the connection unit to the first feeder, a first relay port for connecting the connection unit to a transmitting and diversity receiver port of the first base station, a second relay port for connecting the connection unit to a diversity receiver port of the second base station, a directional coupler for separating signals where a signal in the first feeder port is divided into a first output signal in the first relay port and a second output signal in the second relay port, and the signal in the first relay port is passed undivided to the first feeder port, wherein the second antenna is connected to a second receiving and transmitting port of the first base station.

* * * * *